(12) United States Patent
Ghalib (10) Patent No.: US 7,341,670 B2
(45) Date of Patent: Mar. 11, 2008

(54) METHOD FOR TREATING WASTEWATER

(76) Inventor: Saad A. Ghalib, 3466 Richmond Ct., Ann Arbor, MI (US) 48105

( * ) Notice: Subject to any disclaimer, the term of this patent is extended or adjusted under 35 U.S.C. 154(b) by 45 days.

(21) Appl. No.: 11/143,143

(22) Filed: Jun. 2, 2005

(65) Prior Publication Data

US 2006/0273046 A1    Dec. 7, 2006

(51) Int. Cl.
*C02F 1/50* (2006.01)
(52) U.S. Cl. ............... 210/747; 210/754; 210/764; 405/53
(58) Field of Classification Search .............. 210/747
See application file for complete search history.

(56) References Cited

U.S. PATENT DOCUMENTS

| | | | |
|---|---|---|---|
| 3,592,342 A | 7/1971 | Shankle | |
| 4,457,646 A | 7/1984 | Laesch | |
| 4,865,069 A | 9/1989 | Lacey | |
| 4,892,440 A | 1/1990 | Regan | |
| 5,161,911 A | 11/1992 | Regan | |
| 5,344,562 A | 9/1994 | Lorenz et al. | |
| 5,433,845 A * | 7/1995 | Greene et al. | 210/170 |
| 5,505,840 A | 4/1996 | Caldwell | |
| 5,514,278 A | 5/1996 | Khudenko | |
| 5,752,785 A | 5/1998 | Tanaka et al. | |
| 5,902,477 A | 5/1999 | Vena | |
| 6,000,880 A | 12/1999 | Halus | |
| 6,102,618 A | 8/2000 | Takada et al. | |
| 6,126,361 A | 10/2000 | Gardiner | |
| 6,132,626 A | 10/2000 | Hart | |
| 6,214,228 B1 | 4/2001 | Jones et al. | |
| 6,318,395 B1 | 11/2001 | Anderson et al. | |
| 6,503,404 B2 * | 1/2003 | Ghalib | 210/749 |

(Continued)

OTHER PUBLICATIONS

Franklin L. Burton, "Wastewater Engineering Treatment, Disposal, and Reuse", Metcalf & Eddy, Inc., revised by George Tchobanoglous, pp. 539 through 552 (McGraw-Hill, Inc., 3d Edition).

(Continued)

*Primary Examiner*—Peter A. Hruskoci
(74) *Attorney, Agent, or Firm*—Brooks Kushman P.C.

(57) ABSTRACT

A wastewater treatment system treating excess wastewater from a sewer system includes a generally vertically oriented first shaft structure adapted to receive excess wastewater from the sewer system, a generally vertically oriented second shaft structure spaced apart from the first shaft structure, a connector passage extending between the shaft structures proximate lower ends of the shaft structures, and an effluent passage in fluid communication with the second shaft structure. The treatment system further includes a treating agent dispenser for introducing a treating agent into the wastewater to disinfect at least a portion of the wastewater. During a sufficient rain event, the wastewater flows from the sewer system into the first shaft structure, then through the connector passage and the second shaft structure, and into the effluent passage, such that flow time through the shaft structures is greater than flow time through the connector passage.

16 Claims, 5 Drawing Sheets

U.S. PATENT DOCUMENTS

| | | |
|---|---|---|
| 6,638,424 B2 | 10/2003 | Stever et al. |
| 6,663,769 B2 * | 12/2003 | Hosoya ............... 210/104 |
| 6,726,846 B2 | 4/2004 | Johnstone |
| 6,783,683 B2 * | 8/2004 | Collings ............... 210/669 |
| 6,796,325 B1 | 9/2004 | Courier |
| 7,022,243 B2 * | 4/2006 | Bryant ............... 210/747 |
| 7,025,076 B2 * | 4/2006 | Zimmerman et al. ......... 137/1 |
| 7,025,887 B1 * | 4/2006 | Kirts et al. ............ 210/681 |
| 7,163,635 B2 * | 1/2007 | Fitzgerald ............ 210/747 |
| 2005/0045541 A1 | 3/2005 | Williams et al. |

OTHER PUBLICATIONS

"Design of Municipal Wastewater Treatment Plants", WEF Manual of Practice No. 8 4th Edition, ASCE Manuals and Reports on Engineering Practice No. 76, pp. 11-35 through 11-40 (Water Environment Federation, Alexandria, VA and American Society of Civil Engineers, Reston, VA, 1998).

International Search Report and Written Opinion mailed Oct. 16, 2006, 6 pages.

* cited by examiner

Fig. 5

METHOD FOR TREATING WASTEWATER

BACKGROUND OF THE INVENTION

1. Field of the Invention

The invention relates to systems and methods for treating excess wastewater from a sewer system, such as a combined sewer system or a sanitary sewer system.

2. Background Art

A combined sewer system is a sewer system that is designed to carry both sanitary sewage and storm water runoff. Such sanitary sewage and/or storm water runoff may be referred to as wastewater. During normal conditions, such as dry weather conditions, wastewater is transported by the combined sewer system to a wastewater treatment facility, where the wastewater is treated prior to being discharged. During a rain event, however, flow of wastewater may exceed treatment capacity of the treatment facility. In such a case, overflow wastewater may be diverted to one or more storage basins or tunnels until the treatment facility is able to treat the excess wastewater.

SUMMARY OF THE INVENTION

Under the invention, a wastewater treatment system is provided for treating excess wastewater from a sewer system. The treatment system includes a generally vertically oriented first shaft structure adapted to receive excess wastewater from the sewer system, a generally vertically oriented second shaft structure spaced apart from the first shaft structure, a connector passage extending between the shaft structures proximate lower ends of the shaft structures, and an effluent passage in fluid communication with the second shaft structure. The treatment system further includes a treating agent dispenser for introducing a treating agent into the wastewater. During a sufficient rain event, the wastewater flows from the sewer system into the first shaft structure, then through the connector passage and the second shaft structure, and into the effluent passage, such that flow time through the shaft structures is greater than flow time through the connector passage. Furthermore, the treating agent dispenser is operative to introduce the treating agent to thereby disinfect at least a portion of the wastewater.

Further under the invention, a method for treating excess wastewater from a sewer system is provided. The method includes the steps of receiving the excess wastewater from the sewer system in a generally vertically oriented first shaft structure; allowing the wastewater to flow generally in a first direction through the first shaft structure, then through a connector passage in fluid communication with the first shaft structure, and then generally in a second direction through a generally vertically oriented second shaft structure spaced away from the first shaft structure, wherein the second direction is different than the first direction; introducing a treating agent into the wastewater so as to disinfect at least a portion of the wastewater; and allowing a portion of the wastewater to flow from the second shaft structure to an effluent passage in fluid communication with the second shaft structure after the step of introducing the treating agent; wherein flow time through the shaft structures is greater than flow time through the connector passage.

Still further under the invention, a wastewater receiving system for receiving excess wastewater from a sewer system is provided. The wastewater receiving system includes a generally vertically oriented shaft structure adapted to receive excess wastewater from the sewer system, and an effluent passage in fluid communication with the shaft structure. The shaft structure has a hydraulic diameter and a height greater than at least fifty percent of the hydraulic diameter. During a sufficient rain event, the excess wastewater flows from the sewer system into the shaft structure such that when the shaft structure reaches a predetermined fill level, the wastewater flows across the shaft structure and into the effluent passage.

While exemplary embodiments in accordance with the invention are illustrated and disclosed, such disclosure should not be construed to limit the claims. It is anticipated that various modifications and alternative designs may be made without departing from the scope of the invention.

DETAILED DESCRIPTION

FIGS. 1-5 show a wastewater treatment system 10 according to the invention for treating excess wastewater from a sewer system 12. Sewer system 12 may be, for example, a combined sewer that is designed to carry both sanitary sewage and storm water runoff (combined sewer overflow), or a sanitary sewer system that experiences increased flows during a rain event (sanitary sewer overflow). Such a sanitary sewer system may experience increased flows due to storm water infiltration into the sanitary sewer system. The term "wastewater" as used in the application refers to sanitary sewage and/or storm water runoff.

The wastewater treatment system 10 includes a diversion chamber 13 and an influent passage 14 for receiving excess wastewater, such as wastewater overflow, from the sewer system 12. The treatment system 10 further includes a container having first and second spaced apart portions, such as first and second shaft structures 15 and 16, respectively, in fluid communication with the influent passage 14, and connected together by a connector passage 17.

Figures 1, 2:
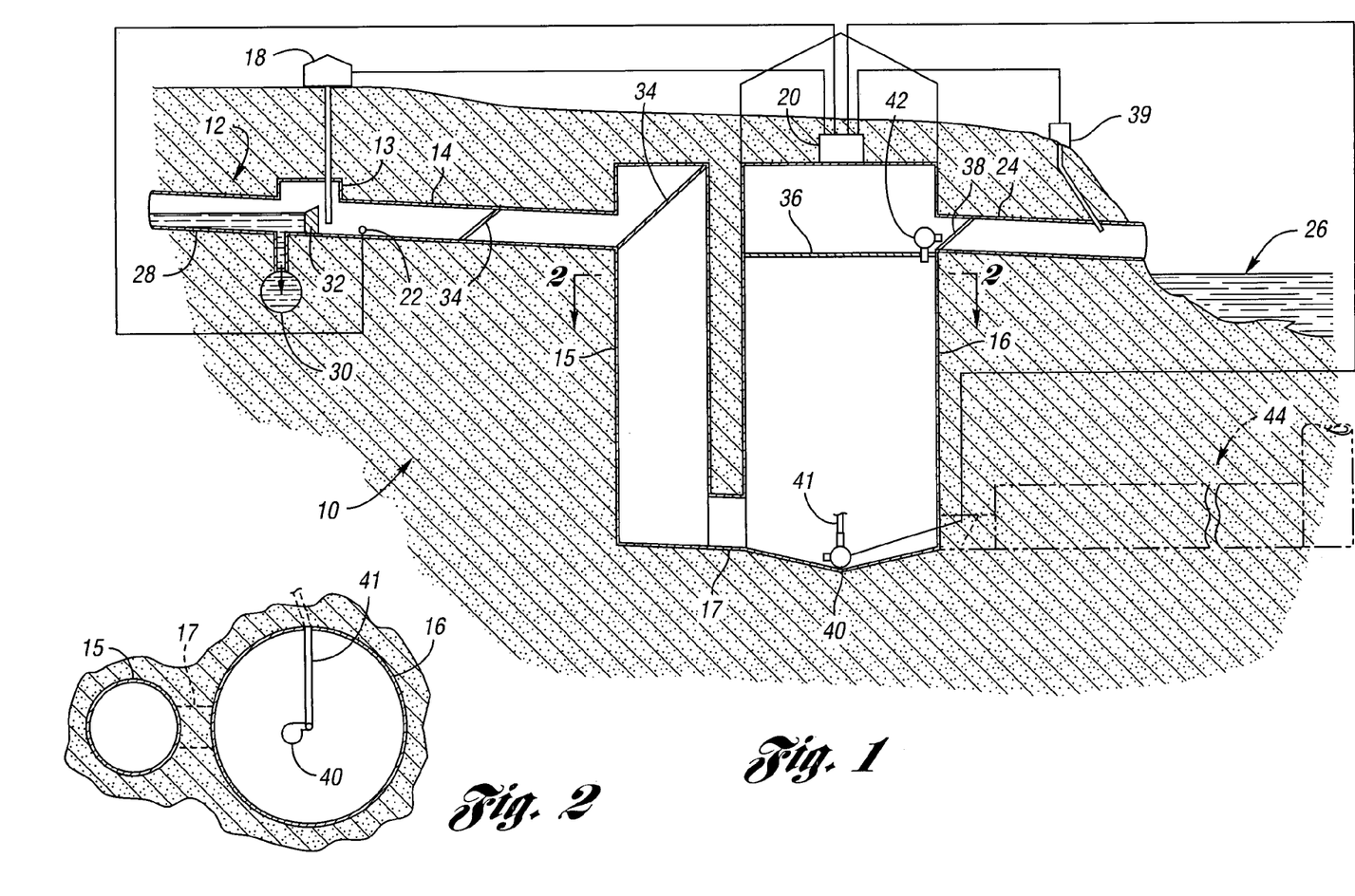
FIG. 1 is a schematic view of a treatment system according to the invention in fluid communication with a sewer system, wherein the treatment system includes first and second shaft structures connected together by a connector passage.
FIG. 2 is a horizontal cross-sectional view of the first and second shaft structures represented in the schematic view of FIG. 1, taken along a line similar to line 2-2 shown in FIG. 1.

In one embodiment of the invention, the shaft structures 15 and 16 are disposed substantially or entirely below ground and are oriented generally vertically. For example, each shaft structure 15 and 16 may have a longitudinal axis that is coincident with a vertical line or that extends at an angle with respect to a vertical line. While the shaft structures 15 and 16 may have any suitable configuration, in one embodiment of the invention, each shaft structure 15 and 16 has a generally circular horizontal cross-section having a diameter in the range of 10 to 200 feet. Alternatively, each shaft structure 15 and 16 may have a cross-section that defines any suitable shape, such as a hexagon, octagon, ellipse, or rectangle, and that has any suitable hydraulic diameter, such as a hydraulic diameter in the range of 5 to 200 feet. In addition, each shaft structure 15 and 16 may have any suitable length, such as a generally vertical length in the range of 30 to 200 feet.

The shaft structures 15 and 16 may have generally the same size and shape. Alternatively, the shaft structures 15 and 16 may have different sizes and/or shapes. For example, the first shaft structure 15 may have a smaller hydraulic diameter than the second shaft structure 16. As a more detailed example, the first shaft structure 15 may have a hydraulic diameter in the range of 5 to 40 feet, and the second shaft structure 16 may have a hydraulic diameter in the range of 20 to 200 feet.

Furthermore, each shaft structure 15 and 16 may be made of concrete, and/or any other suitable material such as steel. For example, each shaft structure 15 and 16 may comprise a plurality of concrete rings that are stacked on top of each other in a sealed relationship.

The connector passage 17 may extend generally horizontally, and may be connected to each shaft structure 15 and 16 proximate a lower end of each shaft structure 15 and 16. Furthermore, the connector passage 17 may have any suitable configuration for allowing wastewater to flow between the shaft structures 15 and 16. For example, the connector passage 17 may be a generally cylindrical structure having a cross-section that defines any suitable shape, such as a circle, hexagon, octagon, ellipse, or rectangle. The connector passage 17 may also have any suitable hydraulic diameter, such as a hydraulic diameter in the range of 5 to 30 feet, and any suitable length, such as a length in the range of 1 to 500 feet. Moreover, the connector passage 17 may comprise concrete and/or any other suitable material, such as steel.

With the above configuration, the volume defined by each shaft structure 15 and 16 may be greater than the volume defined by the connector passage. For example, the volume defined by each shaft structure 15 and 16 may be at least double the volume defined by the connector passage 17.

The treatment system 10 also includes a treating agent dispenser, such as a treating agent injection system 18, for injecting or otherwise introducing a treating agent, such as chlorine or a solution that includes chlorine, into the excess wastewater so as to treat the excess wastewater. For example, the treating agent may be a sodium hypochlorite disinfection solution that is used to disinfect the excess wastewater. The treating agent injection system 18 may also include a mixer (not shown) disposed at or near the point of injection for mixing the treating agent with the excess wastewater. The mixer may include, for example, a bubbler and/or a mechanical mixer.

The treatment system 10 may also include a computer control system, such as a controller 20, in communication with the treating agent injection system 18 for controlling introduction of the treating agent. The controller 20 may also be in communication with a flow sensor 22 disposed in the influent passage 14.

While the treating agent injection system 18 and controller 20 may each be disposed in any suitable position, in the embodiment shown in FIG. 1, the treating agent injection system 18 is located proximate the influent passage 14 and the controller 20 is disposed proximate the second shaft structure 16. As another example, the treating agent injection system 18 and controller 20 may each be disposed proximate, such as on top of, either shaft structure 15 or 16.

Furthermore, the treating agent injection system 18 and 20 may be housed in the same or separate structures or enclosures.

An effluent passage 24 is in fluid communication with the second shaft structure 16. The effluent passage 24 may be used to discharge treated wastewater from the treatment system 10 to a river 26 or any other suitable area, such as another receiving water body.

Figure 3:
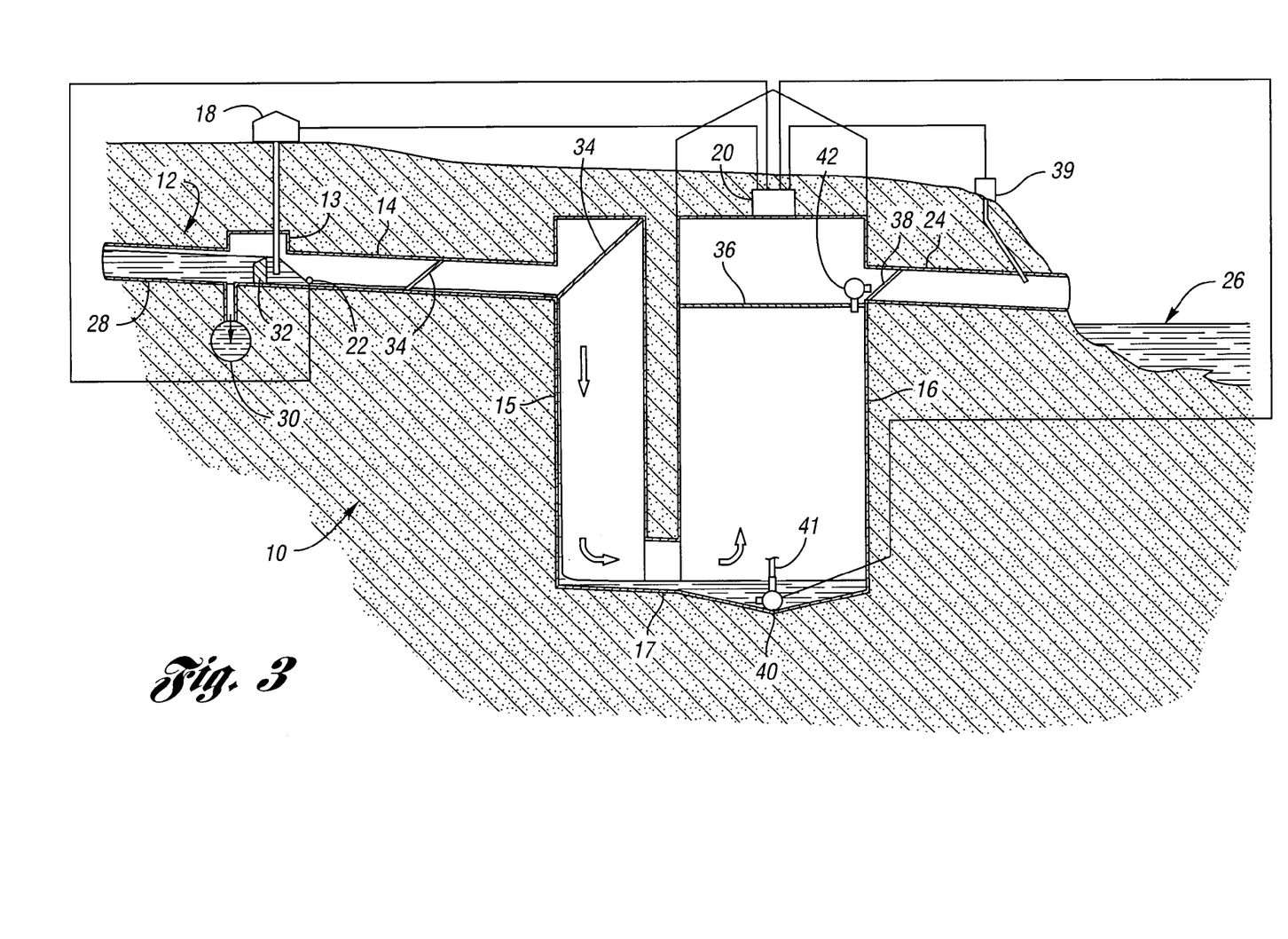
FIG. 3 is a schematic view of the treatment system during a rain event showing excess wastewater flowing from the sewer system into the shaft structures.

Referring to FIGS. 1-5, operation of the treatment system 10 will now be described in detail. Under normal operating conditions, such as during dry weather conditions, wastewater flows through trunk sewer 28 of the sewer system 12 and into an interceptor 30 as shown in FIG. 1. The interceptor 30 carries wastewater to a treatment facility, such as a wastewater treatment plant (not shown). During a sufficient rain event, flow from the trunk sewer 28 will exceed capacity of the interceptor 30, and excess wastewater will flow into influent passage 14. As shown in FIG. 3, for example, excess wastewater may flow over a weir 32 in diversion chamber 13 and into influent passage 14. Advantageously, the treatment system 10 may be configured to handle a relatively large flow rate, such as a flow rate in the range of 2,000 to 1,500,000 gallons per minute.

When flow is detected by the flow sensor 22, for example, the controller 20 may cause the treating agent injection system 18 to initiate injection of the treating agent into the excess wastewater. The treating agent may be injected at any suitable rate, such as a rate sufficient to achieve a treating agent level in the range of 10 to 25 milligrams per liter of excess wastewater, for example. Mixers of the treating agent injection system 20 may also be used to enhance mixing of the treating agent with the excess wastewater. Such mixers may be located, for example, at and/or downstream of the point of treating agent injection.

Alternatively, treating agent injection may begin at any suitable time, such as immediately upon flow exceeding capacity of the interceptor 30, or any time thereafter, such is when flow is detected in one or both of the shaft structures 15 and 16. Furthermore, treating agent injection may occur at any suitable point, such as upstream of the shaft structures 15 and 16, within one or both of the shaft structures 15 and 16, and/or within the connector passage 17. For example, treating agent injection may occur upstream of the weir 32 to facilitate mixing of the treating agent with the excess wastewater.

After flowing over the weir 32, excess wastewater may then flow through one or more screens 34, such as inclined, vertical and/or horizontal screens, located in the influent passage 14 and/or first shaft structure 15 so as to remove floatable matter and/or suspended solids from the excess wastewater. Excess wastewater may then flow generally in a first direction, such as downward, in the first shaft structure 15, through the connector passage 17 and then generally in a second direction, such as upward, in the second shaft structure 16.

Figure 4:
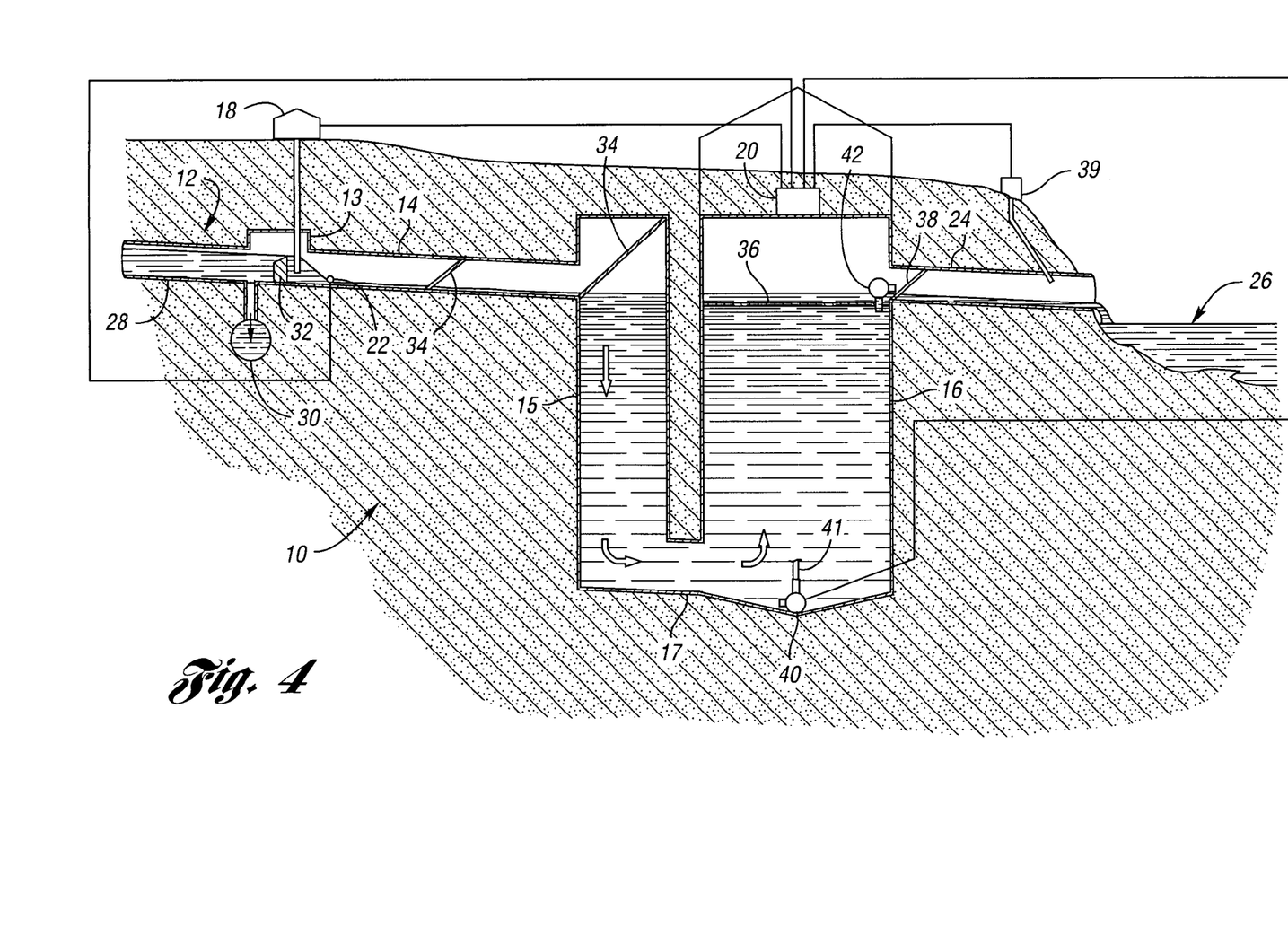
FIG. 4 is a schematic view of the treatment system showing excess wastewater passing from the second shaft structure to an effluent passage in fluid communication with the second shaft structure.

If the rain event continues, excess wastewater will flow through the first shaft structure 15, through the connector passage 17 and into the second shaft structure 16 until the second shaft structure 16 reaches capacity. Eventually, if the rain event continues, treated excess wastewater will flow into the effluent passage 24 and then into the river 26, as shown in FIG. 4. The treatment system 10 may include one or more screens 36, such as inclined, vertical and/or horizontal screens, disposed in the second shaft structure 16, and/or one or more screens 38, such as inclined, vertical and/or horizontal screens, disposed in the effluent passage 24 for removing floatables and/or suspended solids from the treated excess wastewater. Such screens 36 and/or 38 may be provided as an alternative to or in addition to the screens 34 located in the influent passage 14 and/or first shaft structure 15.

The treatment system 10 is configured to enable sufficient contact time to occur between the treating agent and the excess wastewater as the excess wastewater continuously flows from the point of treating agent injection to the point of discharge from the effluent passage 24, so as to achieve sufficient disinfection, e.g., bacteria kill, of the excess wastewater at the point of discharge. Sufficient disinfection may be achieved, for example, when the mean fecal coliform bacteria level is less than 400 counts per 100 milliliters of excess wastewater, or other suitable level.

In one embodiment of the invention, the treatment system 10 may be configured to provide a total contact time in the range of 10 to 30 minutes, which may include contact time that occurs in sewer system 12, the influent passage 14, the shaft structures 15 and 16, the connector passage 17 and/or the effluent passage 24. Alternatively, the treatment system 10 may be configured to provide any suitable contact time, such as a contact time of less than 10 minutes or greater than 30 minutes, so as to achieve a desired disinfection level.

A majority of the contact time, if not all of the contact time, may be provided by the shaft structures 15 and 16 and connector passage 17. Furthermore, in contrast to a prior system having a generally horizontal flow through tunnel where the majority of contact time is provided in the tunnel as compared to corresponding drop and riser shafts, the shaft structures 15 and 16 of the treatment system 10 may be configured to provide a majority of the contact time as compared to the connector passage 17. For example, the flow time through the shaft structures 15 and 16 may be at least double the flow time through the connector passage 17. As another example, flow time through each shaft structure 15 and 16 may be at least double the flow time through the connector passage 17.

With the connector passage 17 disposed proximate lower ends of the shaft structures 15 and 16, excess wastewater may flow generally downwardly through the first shaft structure 15, and then generally upwardly through the second shaft structure 16 after passing through the connector passage 17. In one embodiment of the invention, the second shaft structure 16 may be configured to provide an upward flow rate in the range of 0.05 to 1.0 feet per second, for a flow rate into the influent passage 14 in the range of 2,000 to 1,500,000 gallons per minute.

As the excess wastewater flows through the first shaft structure 15, floatable matter that is not trapped by the screens 34 may remain proximate an upper end of the first shaft structure 15. Furthermore, as the excess wastewater flows through shaft structures 15 and 16, relatively heavy solids not removed by the screens 34 and 36 may settle at the bottom of one or both of the shaft structures 15 and 16.

The treatment system 10 may also be configured to provide dechlorination of the excess wastewater before discharging the excess wastewater to the river 26, or other suitable area. For example, the treatment system 10 may include a dechlorinating agent dispenser, such as a dechlorinating agent injection system 39, for introducing a dechlorinating agent, such as sulfate, into the effluent passage 24. The dechlorinating agent injection system 39 may be controlled by the controller 20, or by other suitable means, so that the dechlorinating agent will be introduced at a suitable point. Because dechlorination does not require much, if any, contact time, the dechlorinating agent may be introduced into the effluent passage 24 proximate to the discharge point of the effluent passage 24.

Figure 5:
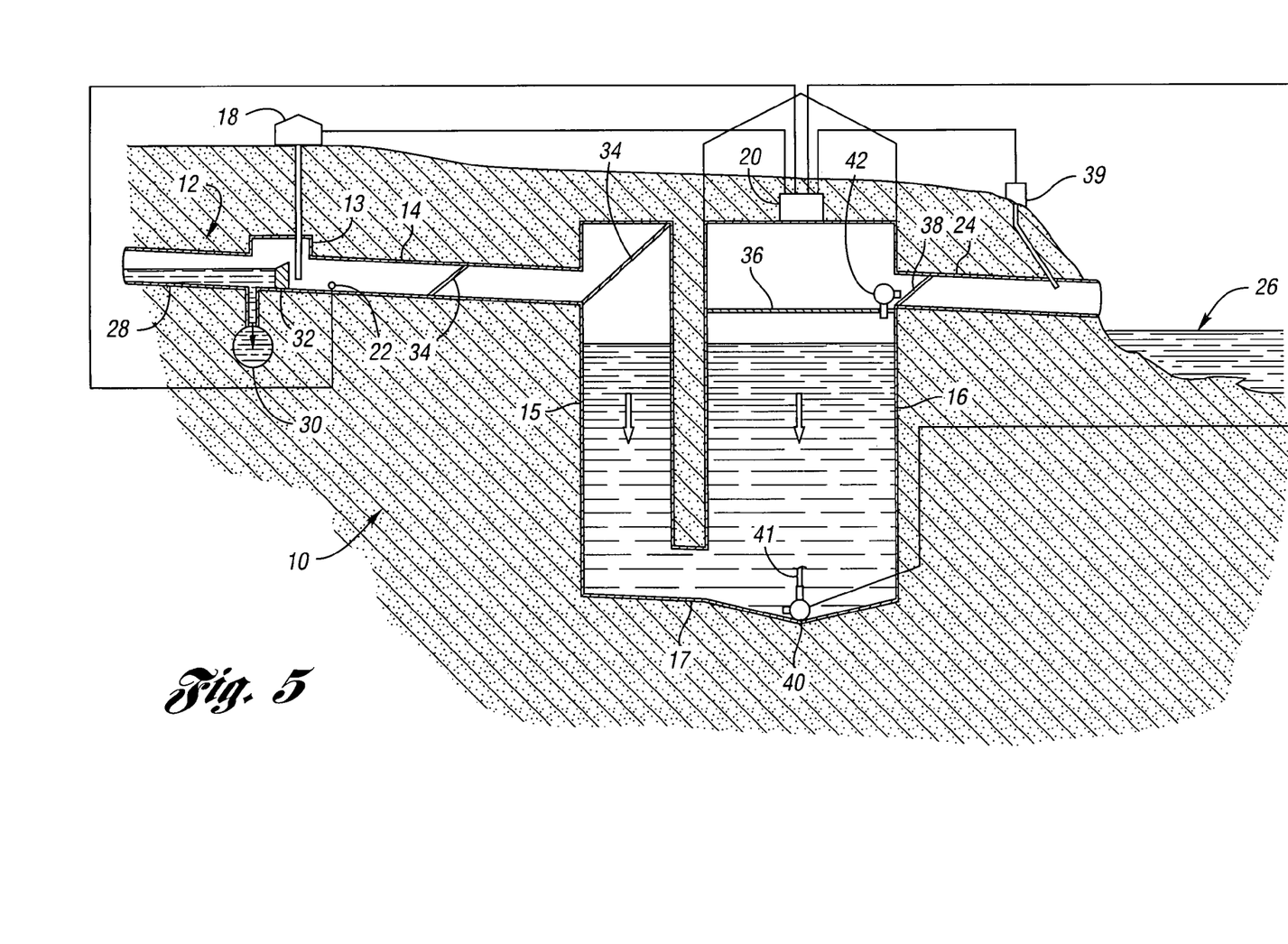
FIG. 5 is a schematic view of the treatment system after the rain event has subsided, and showing the shaft structures being dewatered.

As the rain event subsides, the capacity of the interceptor 30 will no longer be exceeded, and flow to the shaft structures 15 and 16 will cease. Dewatering of the shaft structures 15 and 16 may begin when the interceptor 30, or other suitable passage, has the capacity to accept dewatering flow rates. The dewatering process begins by disposing all of the matter that was collected by the screens 34-38 into one or both of the shaft structures 15 and 16. For example, collected matter may be may be combed, brushed, or otherwise scraped from the screens 34-38. Alternatively, such matter may be removed from the screens 34-38 and disposed of elsewhere. One or more submersible pumps 40, for example, may then be used to pump wastewater from shaft structures 15 and 16 to a dewatering passage 41, such as one or more pipes, in fluid communication with the shaft structures 15 and 16. The dewatering passage 41 may be used to route wastewater from the shaft structures 15 and 16 to the interceptor 30 and/or to another suitable passage so as to route the excess wastewater to the wastewater treatment plant (not shown), for example. In one embodiment, the dewatering passage 41 may extend generally upwardly in the second shaft structure 16, through a side wall of the second shaft structure 16, and to the interceptor 30.

In one embodiment of the invention, the second shaft structure 16 may extend below the first shaft structure 15, and the connector passage 17 may slope downwardly toward the second shaft structure 16 to facilitate dewatering of the shaft structures 15 and 16. As another example, the first shaft structure 15 may extend below the second shaft structure 16, and the connector passage 17 may slope downwardly toward the first shaft structure 15 to facilitate dewatering of the shaft structures 15 and 16 through a dewatering passage disposed in and/or connected directly to the first shaft structure 15.

The treatment system 10 may also include a flushing system (not shown) for flushing one or both of the shaft structures 15 and 16 and/or connector passage 17 to remove sludge, for example. Such a flushing system may have any suitable configuration, such as one or more spray heads or nozzles mounted on one or more shaft side walls and connected to a submersible pump. As another example, the flushing system may include one or more tipping or dump buckets located above the high water level of one or both of the shaft structures 15 and 16.

Because the shaft structures 15 and 16 may be configured to provide relatively small vertical flow velocities, head losses caused by the shaft structures 15 and 16 may be relatively small. For example, head losses associated with the shaft structures 15 and 16 may be less than 3 feet. As a result, head drop between the influent passage 14 and the effluent passage 24 may be relatively small. Consequently, depending on flow rates and available head provided by the sewer system 12, the treatment system 10 may operate as a gravity feed system, wherein excess wastewater may flow through the shaft structures 15 and 16 and out the effluent passage 24 without requiring pumping. Furthermore, low flow velocities through the shaft structures 15 and 16 also enable solids to settle at the bottom of the shaft structures 15 and 16. Alternatively, the treatment system 10 may include one or more pumps 42 for pumping excess wastewater from the second shaft structure 16 into the effluent passage 24, and/or one or more pumps (not shown) for pumping excess wastewater from the influent passage 14 into the first shaft structure 15.

The treatment system 10 may further include an additional container, such as a storage tunnel, that is in inhibitable fluid communication with one or both of the shaft structures 15 and 16. For example, the treatment system 10 may include a tunnel 44 (shown in phantom lines in FIG. 1) connected to the second shaft structure 16 at or near the lower end of the second shaft structure 16. Such a tunnel may be used, for example, to receive a first quantity of excess wastewater or "first flush," which may have a high percentage of total suspended solids. When excess wastewater received in the tunnel 44 reaches a predetermined level, flow to the tunnel 44 may be inhibited, such as by using an automatic gate disposed proximate the junction of the tunnel 44 with the second shaft structure 16. As another example, flow into the tunnel 44 may be inhibited when the tunnel 44 reaches capacity. When flow into the tunnel 44 is inhibited, wastewater may then flow from the first shaft structure 15 to the second shaft structure 16, and then into the effluent passage 24, as described above in detail. Further details regarding the use of such a tunnel are disclosed in U.S. Pat. No. 6,503,404, which is hereby incorporated by reference in its entirety.

Moreover, the treatment system 10 may include more than two spaced apart shaft structures for further increasing flow time and/or contact time. For example, the treatment system 10 may include third and fourth shaft structures (not shown) located proximate the shaft structures 15 and 16. The third shaft structure may be connected to the second shaft structure 16 with a connector passage located proximate upper ends of the second shaft structure 16 and third shaft structure. Likewise, the fourth shaft structure may be connected to the third shaft structure with a connector passage located proximate lower ends of the third and fourth shaft structures.

As another example, a divided shaft structure, such as disclosed in U.S. Pat. No. 6,503,404, may be used in conjunction with the shaft structures 15 and 16. More specifically, such a divided shaft structure may be connected upstream of the first shaft structure 15, and/or downstream of the second shaft structure.

Figure 6:
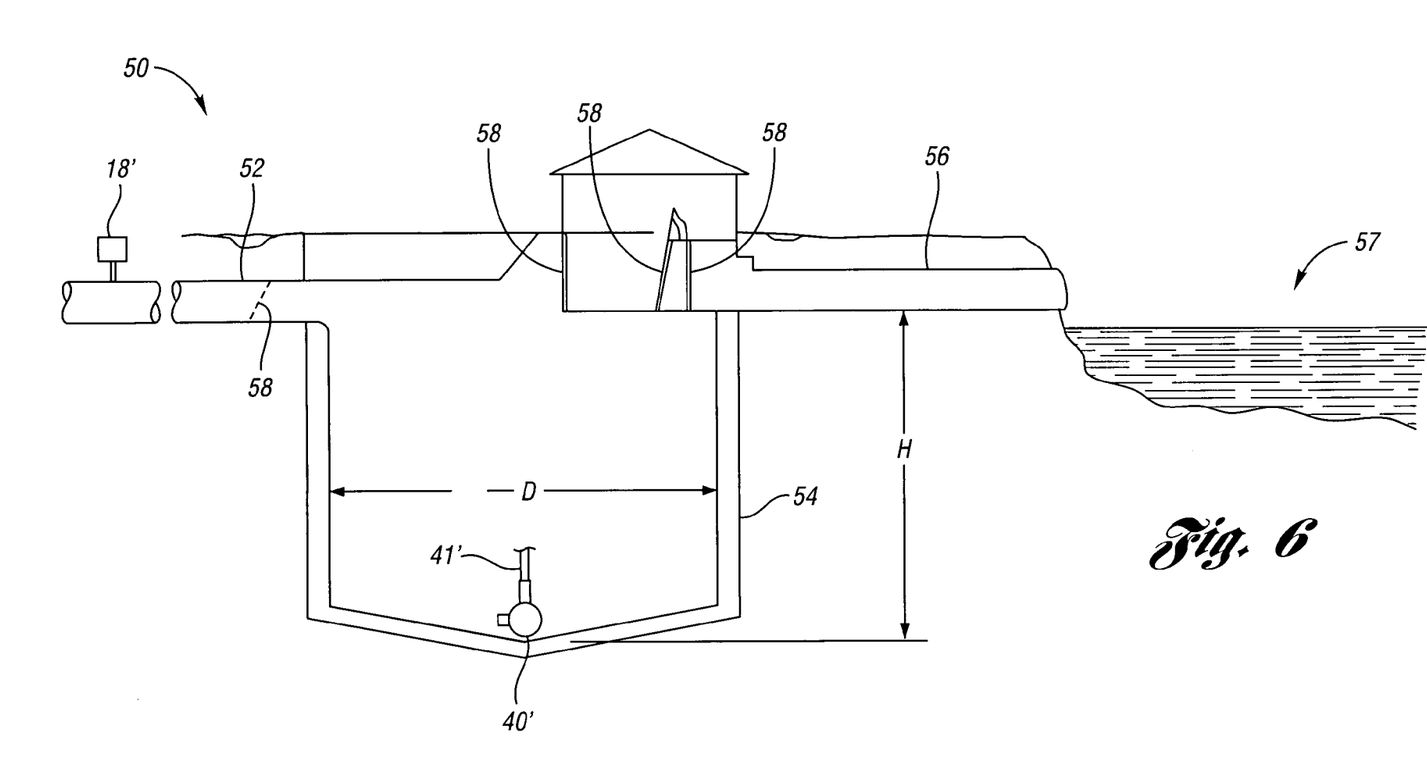
FIG. 6 is a schematic view of a wastewater storage system including a single shaft structure.

FIG. 6 shows a wastewater storage or receiving system 50, according to another aspect of the invention, for receiving excess wastewater from a sewer system, such as sewer system 12 described above, through an influent passage 52. The system 50 includes a generally vertically oriented shaft structure 54 adapted to receive excess wastewater from the sewer system, and an effluent passage 56 in fluid communication with the shaft structure 54.

In this embodiment, treating agent, such as described above, may be added to the excess wastewater upstream of the shaft structure 54 a sufficient distance to achieve necessary contact time prior to the wastewater reaching the shaft structure 54. The treating agent may be injected or otherwise introduced to the wastewater by a treating agent dispenser 18'.

The shaft structure 54 is configured to receive wastewater, such as pretreated wastewater, in relatively large quantities, such as 500,000 gallons to 20,000,000 gallons or more. As another example, the shaft structure 54 may be configured to receive less than 500,000 gallons of wastewater. Furthermore, the shaft structure 54 is configured to allow treated wastewater to be discharged through the effluent passage 56 to a river 57 or any other suitable area, such as another receiving water body, when the wastewater received by the shaft structure 54 reaches a predetermined level.

The shaft structure 54 may have a cross-section that defines any suitable shape, such as a circle, hexagon, octagon, ellipse, or rectangle. Furthermore, the shaft structure 54 may have any suitable hydraulic diameter D and a height H (measured from the bottom of the shaft structure 54 to the bottom of the effluent passage 56 at the junction of the effluent passage 56 with the shaft structure 54) that is greater than at least 50% of the hydraulic diameter D. For example, the hydraulic diameter D may be in the range of 30 to 200 feet, and the height H may be in the range of 50 to 200 feet. In one embodiment, the height H is at least 70% of the hydraulic diameter D, and in another embodiment, the height H is at least 110% of the hydraulic diameter D.

During a sufficient rain event, excess wastewater flows from the sewer system through the influent passage 52 and into the shaft structure 54, such that when the shaft structure 54 reaches a predetermined fill level, the wastewater flows across the shaft structure 54 and into the effluent passage 56. The system 50 may also include one or more screens 58 for filtering the wastewater prior to being discharged.

After the rain event has subsided, the shaft structure 54 may be dewatered in a similar manner as described above with respect to the system 10. For example, the wasterwater contained in the shaft structure 54 may be pumped to the sewer system 12 using one or more submersible pumps 40' connected to dewatering passage 41'. Furthermore, the shaft structure 54 may be flushed in a similar manner as described above with respect to the system 10.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method for treating excess wastewater from a sewer system, the method comprising:

receiving the excess wastewater from the sewer system in a generally vertically oriented first shaft structure;

allowing the wastewater to flow generally in a first direction through the first shaft structure, then through a connector passage in fluid communication with the first shaft structure, and then generally in a second direction through a generally vertically oriented second shaft structure spaced away from the first shaft structure after flowing from the connector passage, wherein the second direction is different than the first direction;

introducing a treating agent into the wastewater so as to sufficiently disinfect at least a portion of the wastewater; and allowing a portion of the wastewater to flow from the second shaft structure to an effluent passage in fluid communication with the second shaft structure after the step of introducing the treating agent;

wherein flow time through the shaft structures is greater than flow time through the connector passage.

2. The method of claim 1 wherein the connector passage defines a volume, and each shaft structure defines a shaft volume that is greater than the volume of the connector passage.

3. The method of claim 1 wherein the first shaft structure has a first hydraulic diameter, and the second shaft structure has a second hydraulic diameter that is greater than the first hydraulic diameter.

4. The method of claim 1 wherein the flow time through the shaft structures is at least double the flow time through the connector passage.

5. The method of claim 1 wherein the flow time through each shaft structure is at least double the flow time through the connector passage.

6. The method of claim 1 wherein the step of receiving the wastewater includes receiving wastewater at a flow rate of at least 2,000 gallons per minute.

7. The method of claim 1 wherein the step of introducing the treating agent includes introducing the treating agent upstream of the first shaft structure.

8. The method of claim 1 wherein the step of introducing the treating agent includes introducing the treating agent within at least one of the shaft structures.

9. The method of claim 1 wherein the step of introducing the treating agent includes introducing the treating agent within the connector passage.

10. The method of claim 1 wherein the first direction is downward and the second direction is upward.

11. The method of claim 10 wherein upward flow rate in the second shaft structure is in the range of 0.05 to 1 feet per second for a flow rate into an influent passage of 2,000 to 1,500,000 gallons per minute.

12. The method of claim 1 wherein during a sufficient rain event, wastewater flows continuously from the first shaft structure, through the connector passage, and then from the connector passage to the second shaft structure.

13. The method of claim 1 further comprising discharging the portion of the wastewater from the effluent passage to a body of water.

14. The method of claim 1 wherein the connector passage has a length in the range of 1 to 500 feet, and each shaft structure has a hydraulic diameter in the range of 5 to 200 feet.

15. The method of claim 1 wherein the first shaft structure has a first hydraulic diameter in the range of 5 to 40 feet, and the second shaft structure has a second hydraulic diameter that is in the range of 20 to 200 feet.

16. The method of claim 1 wherein the shaft structures are disposed substantially below ground level and are configured such that wastewater is able to flow through the shaft structures and to the effluent passage without requiring pumping, and wherein head loss associated with the shaft structures is less than three feet.

* * * * *